US008692963B2

(12) United States Patent
Lu et al.

(10) Patent No.: US 8,692,963 B2
(45) Date of Patent: Apr. 8, 2014

(54) PATTERNED IN-CELL RETARDER FOR TRANSFLECTIVE VERTICALLY ALIGNED LIQUID CRYSTAL DISPLAY AND METHOD OF FABRICATION

(75) Inventors: Ruibo Lu, San Bruno, CA (US); Mary Lou Jepsen, Sausalito, CA (US)

(73) Assignee: Pixel Qi Corporation, San Bruno, CA (US)

( * ) Notice: Subject to any disclaimer, the term of this patent is extended or adjusted under 35 U.S.C. 154(b) by 106 days.

(21) Appl. No.: 13/401,756

(22) Filed: Feb. 21, 2012

(65) Prior Publication Data

US 2012/0218487 A1 Aug. 30, 2012

Related U.S. Application Data

(60) Provisional application No. 61/446,417, filed on Feb. 24, 2011.

(51) Int. Cl.
*G02F 1/1335* (2006.01)
(52) U.S. Cl.
USPC .......................................... 349/114; 349/117
(58) Field of Classification Search
None
See application file for complete search history.

(56) References Cited

U.S. PATENT DOCUMENTS

| 6,621,543 | B2 * | 9/2003 | Moon | 349/115 |
| 7,327,421 | B2 * | 2/2008 | Kaneko | 349/114 |
| 2006/0012737 | A1 * | 1/2006 | Hirai et al. | 349/114 |

* cited by examiner

Primary Examiner — Richard Kim
(74) Attorney, Agent, or Firm — Hickman Palermo Truong Becker Bingham Wong LLP

(57) ABSTRACT

In an embodiment, a transflective LCD comprises pixels each comprising a first polarizing layer; a second polarizing layer; a first substrate layer and a second substrate layer opposite the first substrate layer; the first and second substrate layers are between the first polarizing layer and the second polarizing layer; a liquid crystal material between the first and second substrate layers; an over-coating layer adjacent to the first substrate layer; the over-coating layer comprises at least one opening for a transmissive part; a remainder of the over-coating layer forms in part a reflective part; a patterned in-cell retarder adjacent to the first substrate layer; the patterned in-cell retarder covers at least a portion of the reflective part; a reflective layer between the over-coating layer and the second substrate layer; the reflective layer substantially covers the reflective part; the patterned in-cell retarder is between the reflective layer and the first substrate layer.

30 Claims, 2 Drawing Sheets

PATTERNED IN-CELL RETARDER FOR TRANSFLECTIVE VERTICALLY ALIGNED LIQUID CRYSTAL DISPLAY AND METHOD OF FABRICATION

BENEFIT CLAIM

This application claims the benefit, under 35 U.S.C. 119(e), of prior provisional application 61/446,417, filed Feb. 24, 2011, the entire contents of which are hereby incorporated by reference for all purposes as if fully set forth herein.

TECHNICAL FIELD

The present disclosure relates to Liquid Crystal Displays (LCDs).

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Transflective LCDs may be used in cell phones, electronic books, and personal computers in part because readability of transflective LCDs typically is not limited by ambient lighting conditions. A transflective LCD comprises an array of pixels each having a reflective part and a transmissive part. In the reflective part of a transflective LCD pixel, there may be a metal reflector over a thin film transistor unit. In transflective LCDs that use a relatively small metal reflector in a pixel, while enough backlight may be able to transmit through the pixel, not enough ambient light is reflected to show the pixel at a desired luminance.

On the other hand, in some transflective LCDs that use a relatively large metal reflector in a pixel, while enough ambient light may be reflected, not enough backlight is able to transmit through the pixel. For instance, a circularly polarized backlight may be blocked by the relatively large metal reflector in the reflective part and cannot be efficiently redirected into the transmissive part. This significantly lowers the optical output efficiency of the backlight units (BLUs), and reduces overall light transmittance and brightness in pixels of the transflective LCDs. The problem becomes especially severe when the area of the reflective part is comparable to or larger than that of the transmissive part in the pixel.

BRIEF DESCRIPTION OF THE DRAWINGS

Various embodiments of the present invention will hereinafter be described in conjunction with the appended drawings, provided to illustrate and not to limit the present invention, wherein like designations denote like elements, and in which.

Figure 1:
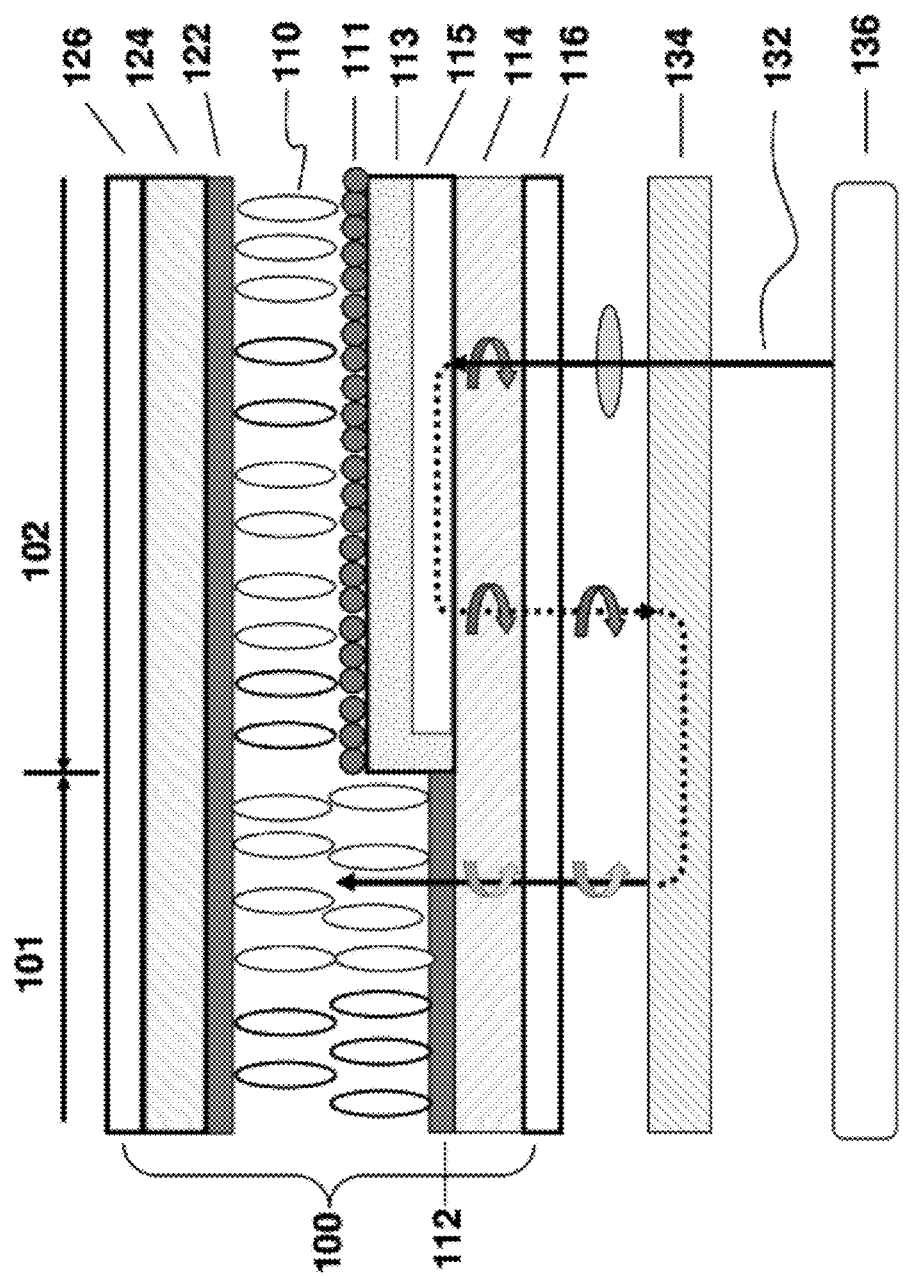
FIG. 1 illustrates a schematic cross-sectional view of an example transflective LCD unit structure in accordance with an embodiment.

The drawings are not rendered to scale.

DETAILED DESCRIPTION

Techniques for patterned in-cell retarders in transflective LCDs are described. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Example embodiments are described herein according to the following outline (outline section headings are for reference purposes only and shall not in any way control the scope of the present invention):
1. GENERAL OVERVIEW
2. EXAMPLE EMBODIMENTS
3. EXAMPLE COMPUTING DEVICE
4. EQUIVALENTS, EXTENSIONS, ALTERNATIVES AND MISCELLANEOUS

1. General Overview

Embodiments include a transflective LCD, which displays color images in the transmissive mode and the transflective mode, and black and white images in the reflective mode. Embodiments include methods and corresponding fabrication processes utilizing patterned in-cell retarders to recycle the blocked backlight from the backlight unit (BLU) in the reflective part, and redirect it into the transmissive part to improve the transmittance and brightness of a transflective LCD. Examples of transflective LCDs include but are not limited to vertically aligned (VA) LCDs.

Embodiments include a patterned in-cell retarder disposed underneath or in-between the over-coating layer behind the bumpy metal reflector in the reflective part. In an embodiment, to effectively recycle backlight, a patterned in-cell retarder is disposed adjacent to an inner surface of a bottom substrate in the reflective part of a transflective LCD unit structure. As used herein, "an inner surface of a bottom substrate" refers to a surface of the bottom substrate facing a liquid crystal material in the transflective LCD unit structure, as further described. The term "transflective LCD unit structure" may refer to a pixel or a sub-pixel in the transflective LCD.

Additionally, optionally, or alternatively, a phase tuning component including but not limited to a phase tuning film may be added in the reflective part to change the phase retardation and the light polarization state for light illuminated upon the phase tuning component or film.

Embodiments include a transflective vertically aligned LCD with backlight recirculation function that recycles the backlight in the reflective part into the transmissive part. Embodiments include a transflective vertically aligned LCD with patterned in-cell retarders with the function of phase tuning or circular light reflection specifically in the reflective part.

Embodiments include a transflective LCD with high backlight output efficiency. Additionally, optionally, or alternatively, embodiments include a transflective LCD with high brightness. Additionally, optionally, or alternatively, embodiments include a transflective LCD with efficient power saving ability.

In an embodiment, a transflective liquid crystal display comprises a plurality of pixels, each pixel comprising: a first polarizing layer; a second polarizing layer; a first substrate layer and a second substrate layer opposite to the first substrate layer, wherein the first substrate layer and the second substrate layer are between the first polarizing layer and the second polarizing layer; a liquid crystal material between the first substrate layer and the second substrate layer; an over-coating layer adjacent to the first substrate layer, wherein the over-coating layer comprises at least one opening that forms in part a transmissive part and wherein a remainder of the over-coating layer forms in part a reflective part; a patterned in-cell retarder adjacent to the first substrate layer, wherein the patterned in-cell retarder covers at least a portion of the reflective part; and a reflective layer between the over-coating layer and the second substrate layer, wherein the reflective layer substantially covers the reflective part; wherein the patterned in-cell retarder is between the reflective layer and the first substrate layer.

In an embodiment, the first polarizing layer and the second polarizing layer comprise circular polarizers. In an embodiment, the over-coating layer comprises scattering and diffusive over-coating materials.

In an embodiment, the over-coating layer comprises a phase tuning film or a phase tuning component configured to align phases of recycled backlight.

In an embodiment, the transflective liquid crystal display further comprises a light source that directs light through the at least one opening in the over-coating layer; wherein the first polarizing layer is adjacent to an outer surface of the first substrate layer, and wherein the pixel comprises a reflective polarizer between the light source and the first polarizing layer.

In an embodiment, a pixel in the plurality of pixels further comprises a first electrode layer adjacent to the first substrate layer. The first electrode layer may comprise a conductive oxide layer.

In an embodiment, a pixel in the plurality of pixels comprises a switching element that is configured to determine an intensity of light transmitting through the transmissive part. The switching element may further comprise a Transistor-Transistor-Logic interface.

In an embodiment, a transmissive part as described herein is covered by a color filter.

In an embodiment, a reflective region may be configured between the patterned in-cell retarder and the backlight unit. The patterned in-cell retarder may form a layer covering all or substantially all (e.g., 50% or more) of the area of the reflective part in a pixel, which area receives the incident backlight. The reflective region may comprise an over-coating layer of a scattering or diffusive type. Additionally and/or optionally, a phase tuning component may be configured with the over-coating layer in the reflective part to alter the phase or polarity state of the recycled light passing through the phase tuning component to increase light enhancement and/or to reduce light cancellation.

In some embodiments, the patterned in-cell retarder is next to a surface of the bottom substrate. The surface may be closer to the liquid crystal layer as compared to an opposing of the bottom substrate. In some embodiments, a metallic reflective layer is located on the top side of the over-coating layer, close to the liquid crystal layer. The metallic reflective layer may be a bumpy metal reflector with a bumpy surface structure facing ambient light. Thus, in these configurations, a pixel comprises a metal reflective component in the reflective part to reflect ambient light and the patterned in-cell retarder and phase tuning component in the reflective part to recycle backlight into the transmissive part. Specifically, while the metallic reflective layer effectively reflects ambient light, the patterned in-cell retarder and phase tuning component adjacent to the inner surface of the bottom substrate effectively re-circulates the backlight received from the BLU until the re-circulated backlight emits out of the transmissive part towards a viewer of the transflective display panel. In some embodiments, the metallic reflective layer comprises an opaque metal layer such as aluminum (Al) or silver (Ag).

In some embodiments, a transflective LCD as described herein transmits circularly polarized light. In these embodiments, the transflective LCD may be configured with one or more circular polarizers.

A circular polarizer as described herein may comprise a quarter-wave plate or a combination of a half-wave plate and a quarter-wave plate. Circularly polarized light may be reflected and recycled one or more times within the reflective region until exiting through the transmissive part towards a viewer, thereby increasing the optical output of the BLU and further enhancing the brightness of the transmissive part.

In some embodiments, a transflective LCD as described herein forms a part of a computer, including but not limited to a laptop computer, netbook computer, cellular radiotelephone, electronic book reader, point of sale terminal, desktop computer, computer workstation, computer kiosk, or computer coupled to or integrated into a gasoline pump, and various other kinds of terminals and display units.

In some embodiments, a method comprises providing a transflective LCD as described, and a backlight source to the transflective LCD.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Example Embodiments

FIG. 1 illustrates a schematic cross-sectional view of an example transflective LCD unit structure 100. In some embodiments, the LCD unit structure 100 comprises at least a transmissive part 101 and a reflective part 102. A liquid crystal layer 110 is sandwiched in the space between a bottom substrate 114 and a top substrate 124.

The transmissive part 101 may have a different or same liquid crystal cell gap than that of the reflective part 102. As used in this disclosure, "a liquid crystal cell gap" refers to the thickness of the liquid crystal layer in either the transmissive part or the reflective part. In an example embodiment, the LCD unit structure 100 is divided into at least two different parts with the different LC cell gaps as the respective transmissive part 101 in the thick cell gap region and reflective part 102 in the thin cell gap region.

In some embodiments, vertically aligned (VA) liquid crystal materials may be used to fill the liquid crystal cell gaps 110 in the transmissive part 101 and the reflective part 102, for the purpose of being driven by applied external electric field. In some other embodiments, liquid crystal materials with different alignments (for example, horizontal alignment) may be configured in liquid crystal cell gaps as described herein.

The LCD unit structure 100, which may comprise a pair of circular polarizers to transmit circularly polarized light, comprises a configuration for recycling circularly polarized light. An example of circular polarizer as described herein includes, but is not limited to, a linear polarizer with a quarter-wave plate, or a linear polarizer with a half-wave plate and a quarter-wave plate to form a wide-band circular polarizer.

An over-coating layer 113 may be deposited in the reflective part 102 to make the liquid crystal cell gap of the reflective part smaller than the liquid crystal cell gap of the transmissive part 101. In some embodiments, in part due to the over-coating layer 113, the liquid crystal cell gap in the reflective part 102 may be approximately half of the liquid crystal cell gap in the transmissive part 101. In various embodiments, the over-coating layer 113 may comprise acrylic resin, polyamide, or novolac epoxy resin. The over-coating layer 113 may be doped with inorganic particles such as silicon oxide (SiO2) to provide scattering and diffusive optical properties. To make the over-coating layer 113 itself to further possess the phase tuning function, a thermotropic anisotropic liquid crystal material such as a nematic phase may be further doped in the over-coating layer 113. Additionally, optionally, or alternatively, the thermotropic polymer liquid crystal material itself may be used to form the over-coating layer 113 and/or to replace the patterned in-cell retarder 115.

One surface, which is the top surface in FIG. 1, of over-coating layer 113 may be covered with a metallic reflective layer 111 such as aluminum (Al) or silver (Ag) to work as the reflective electrode. In some embodiments, this metallic reflective layer 111 may be a bumpy metal layer.

A patterned in-cell retarder 115 may be deposited above the bottom substrate 114 in the reflective part 102, for example, on the top surface of the bottom substrate 114 in FIG. 1. In some embodiments, the patterned in-cell retarder 115 is deposited beneath or in-between the over-coating layer 113, but underneath the bumpy mental reflector layer 111 in the reflective part 102. In some embodiments, the patterned in-cell retarder 115 is deposited and replaces the over-coating layer 113 directly, where the bumpy mental reflector layer 111 is deposited on the top surface of the patterned in-cell retarder 115 in the reflective part 102.

The bottom substrate 114 may be made of glass or other substrate materials. On the inner surface of the bottom substrate 114 in the transmissive part 101, a transparent indium-tin oxide (ITO) layer 112 may be provided as the pixel electrode. Color filters, not shown in FIG. 1, may be deposited on or near a surface of the top substrate 124. The color filters may cover both the transmissive part 101 and the reflective part 102, or only cover the transmissive part 101. An ITO layer 122 may be located between the top substrate 124 and the liquid crystal layer 110 as a common electrode. A bottom circular polarizer 116 and a top circular polarizer 126 may be attached on outer surfaces of the bottom substrate 114 and top substrate 124 respectively.

A reflective polarizer 134 may be located between the BLU 136 and the bottom circular polarizer 116. The reflective polarizer 134 may comprise a cholesteric liquid crystal film working as a circularly polarized light reflector. The reflective polarizer 134 may be configured to reflect the circularly polarized light using either the right-handed or left-handed directions and transmit circularly polarized light in an opposite polarizing handedness or direction.

2.1 A First Example Embodiment

In a first embodiment, the patterned in-cell retarder 115 may be a quarter-wave retarder for a certain incident light wavelength such as at 550 nm or other wavelengths. In some embodiments, the patterned in-cell retarder 115 may be implemented with a wide-band quarter-wave retarder comprising a half-wave film and a quarter-wave film. The patterned in-cell retarder 115 may be a thermotropic anisotropic liquid crystal material, which may be, but is not limited to, a thermotropic polymer liquid crystal material having a property of enduring high temperature processing in the thin film transistor (TFT) preparation or fabrication.

In an example, to prepare the patterned in-cell retarder 115, a pre-polymer LC mesogen quarter-wave retarder may be printed through a polyimide printer onto the bottom substrate 114 in the reflective part 101 directly. The pre-polymer LC mesogen may be, but is not limited to, a reactive one such as RMS 03001, commercially available from Merck. To prepare a single wavelength quarter-wave retarder, for the purpose of controlling the optical axis of the patterned LC retarder, a polarized UV light may be exposed to the printed pre-polymer LC mesogens to cure it at an example azimuthal angle such as at 45° to the entrant light through the bottom polarizer 116 to achieve high or the highest light transmittance and reflectance. The patterned in-cell retarder 115 may occupy all or a portion of the total area of the reflective area 102.

In another example, to prepare the patterned in-cell retarder 115, the pre-polymer LC mesogens may be spun onto the bottom substrate 114 first. Subsequently, a polarized UV light may be partially exposed to the pre-polymer LC mesogens, and the part of the pre-polymer LC mesogens in the reflective part 102 may be retained while the part of the pre-polymer LC mesogens in the transmissive part 101 may be etched away either through positive or negative photo-resistors. To prepare a wide-band quarter-wave retarder, a patterned quarter-wave film and a patterned quarter-wave film may be deposited, for example, in the reflective part 102.

An example fabrication process may be, but is not limited to, the following: a pre-polymer LC mesogen such as a reactive one, RMS 03001, is first spun onto the bottom substrate 114, and then a polarized UV light is partially exposed to the pre-polymer LC mesogen. After etching, the region in the reflective part 102 works as a half-wave film. The UV light exposure direction determines the optical axis of thus formed half-wave film. A second layer of pre-polymer LC mesogens is then spun onto the previously formed patterned half-wave film and the bottom substrate 114. By a similar polarized UV light etching process, a quarter-wave film is prepared above the half-wave film in the reflective part 102.

To achieve the wide-band quarter wave configuration, the optical configuration of the patterned half-wave and quarter-wave retarders may satisfy the following relations by controlling the exposing angle of the polarized UV light unto the pre-polymer LC mesogens:

$$60 \leq 4\theta_h - 2\theta_q \leq 120, \quad \text{(Rel. 1a)}$$

or $$-120 \leq 4\theta_h - 2\theta_q \leq -60 \quad \text{(Rel. 1b)}$$

where $\theta_h$ and $\theta_q$ are the azimuthal angles of the half-wave film and quarter-wave film respectively. One or both of these angles may be controlled by the spinning and UV curing process correspondingly.

2.2 A Second Example Embodiment

In a second embodiment, the patterned in-cell retarder 115 may be a cholesteric liquid crystal (CLC) film for a certain resonant light wavelength such as at 550 nm or other wavelengths.

In some embodiments, the patterned in-cell retarder 115 may be implemented with a stacked RGB CLC film to reflect and transmit the whole-band BLU light, or separate R.G. B. CLC films to their respective resonant wavelengths under a single unit reflective pixel.

In an example, to prepare the patterned in-cell retarder 115, pre-polymer CLC mesogens may be printed through the polyimide printer onto the bottom substrate 114 in the reflective part 101 directly. To prepare a narrow-band CLC film, a UV light may be exposed to the printed pre-polymer LC mesogens to cure it. In some embodiments, the thickness of the cured polymer CLC film is at least 10 times of the specified resonant wavelength to achieve the highest light transmittance and reflectance.

In another example, to prepare the patterned in-cell retarder 115, the pre-polymer CLC mesogens may be spun onto the bottom substrate 114 first. Then a UV light is partially exposed to the pre-polymer LC mesogens, and retains the part in the reflective part 102 while etching away in transmissive part 101 either through positive or negative photo-resistors. To implement the patterned in-cell retarder 115 with stacked wide-band CLC film, or separate R.G. B. CLC films with their respective resonant wavelength under a single unit reflective pixel, a patterned polymer CLC reflecting red light may be firstly deposited onto the bottom substrate 114. Subsequently, patterned polymer CLC reflecting green and blue light may be deposited onto the bottom substrate 114 and previous deposited CLC(s).

An example fabrication process may be, but is not limited to, the following: a pre-polymer CLC mesogen configured with the pitch/grating to reflect red light is first spun onto the bottom substrate 114, and then a UV light is partially exposed to the pre-polymer CLC mesogen. After etching, the part in the reflective part 102 is retained to work as the patterned Red CLC film. Second and third layers of pre-polymer CLC mesogen, which have the respective resonant pitch/grating to reflect green and blue light, are then spun onto the bottom substrate 114. By the similar UV light exposure process and etching process as of fabricating the Red CLC film, the patterned Green and Blue CLC films may be made. If the R.G.B. patterned CLC films are piled up by layer and layer vertically on the same location, a stacked RGB CLC film may be obtained to transmit or reflect the whole-band BLU light. If the patterned R.G. B. CLC films are arranged on parallel under a single unit reflective pixel as in the reflective part 102, the configuration of separate R.G. B. CLC film to its respective resonant reflecting wavelength may be realized. In some embodiments, the thickness of the patterned R.G.B. polymer CLC film is at least 10 times of the specified resonant wavelength to achieve the highest light transmittance and reflectance.

2.3 Example Operation

For the purpose of illustration only, the reflective polarizer 134 may be configured to reflect the circularly light of the right-handed one and transmit the circularly light of the left-handed one. In the reflective part 102, the backlight 132 from BLU 136 first passes through the reflective polarizer 134, and then enters the bottom circular polarizer 116 with a left-handed circularly polarized light state into the bottom region of the reflective part 102.

The incident light 132, which is unpolarized at the initial stage, passes through the bottom circular polarizer 116, and the corresponding light polarization states become the left-handed circularly polarized one. After hitting on the patterned in-cell retarder 115, which may be phase variation tuning retarder such as a quarter-wave plate, or a circularly polarized light reflector from cholesteric liquid crystal layer, and then the bottom surface of bumpy reflector 111, the incident light 132 will be reflected back to the bottom circular polarizer 116. The reflected circularly polarized light or depolarized elliptically light may be divided into a left-handed circularly polarized one and a right-handed circularly polarized one. Therefore, the reflected incident light 132 with the left-handed circularly polarization state will be blocked and scattered back into the over-coating layer 113, while parts of the incident light 132 with the right-handed circularly polarization state exit the bottom circular polarizer 116. By the reflection of reflective polarizer 134, the exited light 132 with the right-handed circularly polarization state are redirected into the transmissive part 101 mainly from the region covered by patterned in-cell retarder 115. In this way, the BLU light portion in the reflective part 102 is recycled into the transmissive part 101 and the backlight recirculation is realized. Through this backlight recirculation, more light than otherwise may be redirected into the transmissive part 101 from the reflective part 102. In contrast, backlight in LCDs under other conventional approaches is forbidden or physically inhibited due to handedness conflict from the circular polarizer configuration.

Therefore, under techniques as described herein, high optical output efficiency from a BLU may be obtained and enhanced brightness in the transmissive part 101 may be achieved. Since backlight is efficiently used, reused or recycled, techniques as described herein may be used to further reduce the power consumption from a BLU, realizing efficient power saving ability for a transflective LCD implemented with the techniques.

3. Example Computing Device

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, analog circuits, mixed signal devices, handsets, networking devices or any other device that incorporates hard-wired and/or program logic to implement the techniques.

Figure 2:
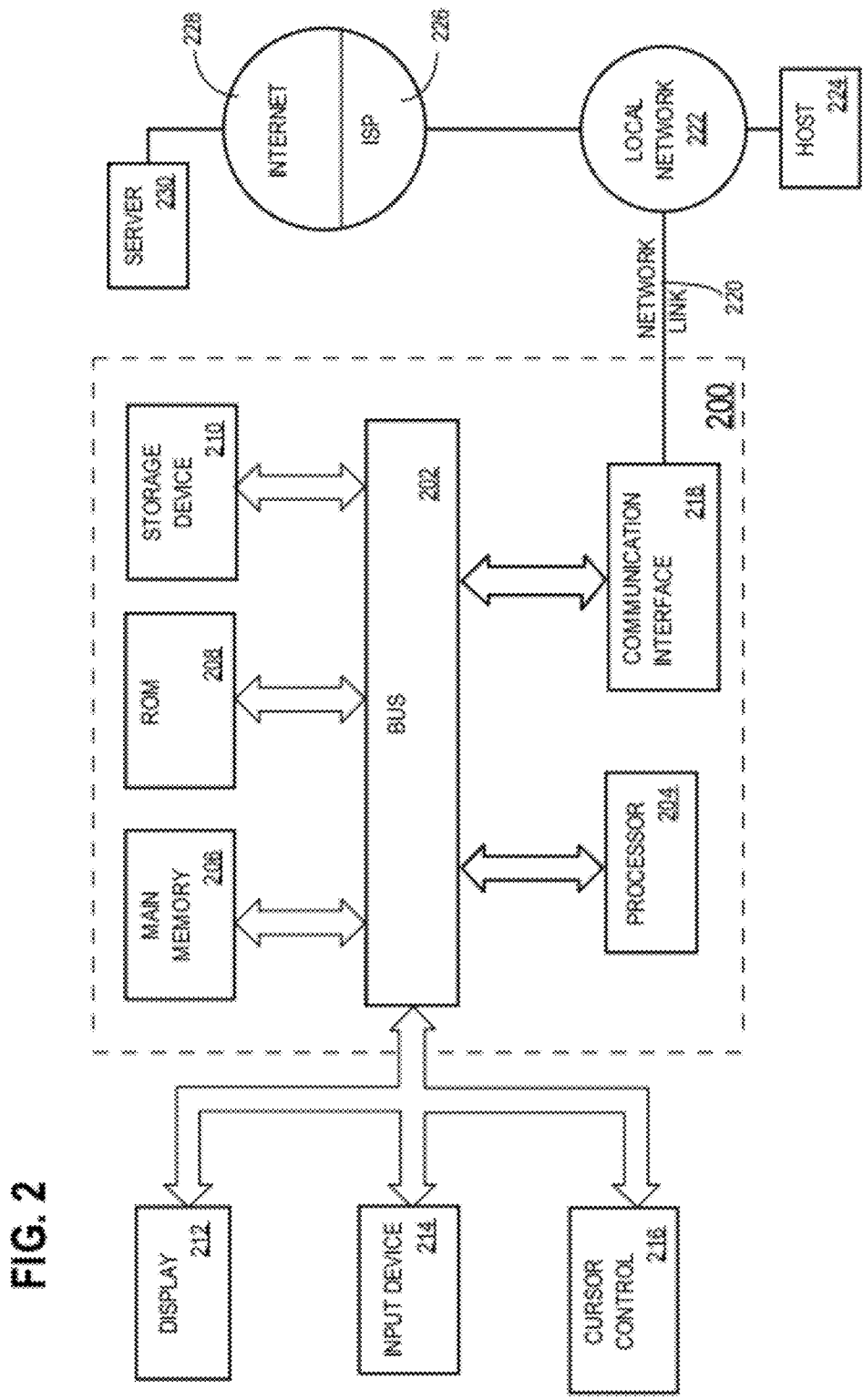
FIG. 2 illustrates an example computing device, according an embodiment.

For example, FIG. 2 is a block diagram that illustrates a computer system 200 upon which a possible embodiment of the invention may be implemented. Computer system 200 includes a bus 202 or other communication mechanism for communicating information, and a hardware processor 204 coupled with bus 202 for processing information. Hardware processor 204 may be, for example, a general purpose microprocessor, digital signal processor, or other processor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a liquid crystal display apparatus, for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

Computer system 200 may implement the techniques described herein using customized hard-wired logic, one or more ASICs or FPGAs, firmware and/or program logic which in combination with the computer system causes or programs computer system 200 to be a special-purpose machine. According to one embodiment, the techniques herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are example forms of transmission media.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. The received code may be executed by processor 204 as it is received, and/or stored in storage device 210, or other non-volatile storage for later execution.

4. Extensions and Variations

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention, as described in the claims.

What is claimed is:

1. A transflective liquid crystal display comprising a plurality of pixels, each pixel comprising:
   a first polarizing layer;
   a second polarizing layer;
   a first substrate layer and a second substrate layer opposite to the first substrate layer, wherein the first substrate layer and the second substrate layer are between the first polarizing layer and the second polarizing layer;
   a liquid crystal material between the first substrate layer and the second substrate layer;
   an over-coating layer adjacent to the first substrate layer, wherein the over-coating layer comprises at least one opening that forms in part a transmissive part and wherein a remainder of the over-coating layer forms in part a reflective part;
   a patterned in-cell retarder in direct contact with an inner surface of the first substrate layer, wherein the patterned in-cell retarder covers at least a portion of the reflective part; and
   a reflective layer between the over-coating layer and the second substrate layer, wherein the reflective layer substantially covers the reflective part;

wherein the patterned in-cell retarder is between the reflective layer and the first substrate layer.

2. The transflective liquid crystal display according to claim 1, wherein the first polarizing layer and the second polarizing layer comprise circular polarizers.

3. The transflective liquid crystal display according to claim 1, wherein the over-coating layer comprises a scattering and diffusive over-coating materials.

4. The transflective liquid crystal display according to claim 1, wherein the over-coating layer comprises a phase tuning component configured to align phases of recycled backlight.

5. The transflective liquid crystal display according to claim 1, further comprising a light source that directs light through the at least one opening in the over-coating layer; wherein the first polarizing layer is adjacent to an outer surface of the first substrate layer, and wherein the pixel comprises a reflective polarizer between the light source and the first polarizing layer.

6. The transflective liquid crystal display according to claim 1, wherein the pixel further comprises a first electrode layer adjacent to the first substrate layer.

7. The transflective liquid crystal display according to claim 6, wherein the first electrode layer comprises a conductive oxide layer.

8. The transflective liquid crystal display according to claim 1, wherein the pixel comprises a switching element that is configured to determine an intensity of light transmitting through the transmissive part.

9. The transflective liquid crystal display according to claim 8, wherein the switching element further comprises a Transistor-Transistor-Logic interface.

10. The transflective liquid crystal display according to claim 1, wherein the transmissive part is covered by a color filter.

11. The transflective liquid crystal display according to claim 1, wherein the patterned in-cell retarder is positioned and aimed to recycle backlight in the reflective part into the transmissive part.

12. The transflective liquid crystal display according to claim 1, wherein the patterned in-cell retarder is located in a backlight re-circulation region between the reflective layer and a backlight unit in the reflective part.

13. The transflective liquid crystal display according to claim 1, wherein the patterned in-cell retarder occupies 50% or more of an entire reflective area of the reflective part.

14. A computer, comprising:
   one or more processors;
   a transflective liquid crystal display coupled to the one or more processors and comprising a plurality of pixels, a pixel comprising:
   a first polarizing layer;
   a second polarizing layer;
   a first substrate layer and a second substrate layer opposite to the first substrate layer, wherein the first substrate layer and the second substrate layer are between the first polarizing layer and the second polarizing layer;
   a liquid crystal material between the first substrate layer and the second substrate layer;
   an over-coating layer adjacent to the first substrate layer, wherein the over-coating layer comprises at least one opening that forms in part a transmissive part and wherein a remainder of the over-coating layer forms in part a reflective part;
   a patterned in-cell retarder in direct contact with an inner surface of the first substrate layer, wherein the patterned in-cell retarder covers at least a portion of the reflective part; and
   a reflective layer between the over-coating layer and the second substrate layer, wherein the reflective layer substantially covers the reflective part;
   wherein the patterned in-cell retarder is between the reflective layer and the first substrate layer.

15. The computer according to claim 14, wherein the first polarizing layer and the second polarizing layer comprise circular polarizers.

16. The computer according to claim 14, wherein the over-coating layer comprises scattering and diffusive over-coating materials.

17. The computer according to claim 14, wherein the over-coating layer comprises a phase tuning component configured to align phases of recycled backlight.

18. The computer according to claim 14, further comprising a light source that directs light through the at least one opening in the over-coating layer; wherein the first polarizing layer is adjacent to an outer surface of the first substrate layer, and wherein the pixel comprises a reflective polarizer between the light source and the first polarizing layer.

19. The computer according to claim 14, wherein the pixel comprises a switching element that is configured to determine an intensity of light transmitting through the transmissive part.

20. The computer according to claim 14, wherein the patterned in-cell retarder is positioned and aimed to recycle backlight in the reflective part into the transmissive part.

21. The computer according to claim 14, wherein the patterned in-cell retarder is located in a backlight re-circulation region between the reflective layer and a backlight unit in the reflective part.

22. The computer according to claim 14, wherein the patterned in-cell retarder occupies 50% or more of an entire reflective area of the reflective part.

23. A method of fabricating a transflective liquid crystal display, comprising:
   providing a plurality of pixels, a pixel comprising:
   a first polarizing layer;
   a second polarizing layer;
   a first substrate layer and a second substrate layer opposite to the first substrate layer, wherein the first substrate layer and the second substrate layer are between the first polarizing layer and the second polarizing layer;
   a liquid crystal material between the first substrate layer and the second substrate layer;
   an over-coating layer adjacent to the first substrate layer, wherein the over-coating layer comprises at least one opening that forms in part a transmissive part and wherein a remainder of the over-coating layer forms in part a reflective part;
   a patterned in-cell retarder in direct contact with an inner surface of the first substrate layer, wherein the patterned in-cell retarder covers at least a portion of the reflective part; and
   a reflective layer between the over-coating layer and the second substrate layer, wherein the reflective layer substantially covers the reflective part;
   wherein the patterned in-cell retarder is between the reflective layer and the first substrate layer.

24. The method according to claim 23, wherein the first polarizing layer and the second polarizing layer comprise circular polarizers.

25. The method according to claim 23, wherein the over-coating layer comprises scattering and diffusive materials.

26. The method according to claim 23, wherein the over-coating layer comprises a phase tuning component configured to align phases of recycled backlight.

27. The method according to claim 24, further comprising providing a light source that provides light through the at least one opening in the over-coating layer; wherein the first polarizing layer is adjacent to an outer surface of the first substrate layer, and wherein the pixel comprises a reflective polarizer between the light source and the first polarizing layer.

28. The method according to claim 24, wherein the patterned in-cell retarder is positioned and aimed to recycle backlight in the reflective part into the transmissive part.

29. The method according to claim 24, wherein the patterned in-cell retarder is located in a backlight re-circulation region between the reflective layer and a backlight unit in the reflective part.

30. The method according to claim 24, wherein the patterned in-cell retarder occupies 50% or more of an entire reflective area of the reflective part.

* * * * *